US010990850B1

(12) United States Patent
Chen et al.

(10) Patent No.: US 10,990,850 B1
(45) Date of Patent: Apr. 27, 2021

(54) KNOWLEDGE DISTILLATION AND AUTOMATIC MODEL RETRAINING VIA EDGE DEVICE SAMPLE COLLECTION

(71) Applicant: Amazon Technologies, Inc., Seattle, WA (US)

(72) Inventors: Gang Chen, Fremont, CA (US); William Shannon Fu, La Canada, CA (US); Long Gao, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 19 days.

(21) Appl. No.: 16/217,400

(22) Filed: Dec. 12, 2018

(51) Int. Cl.
*G06K 9/62* (2006.01)
*G06N 20/00* (2019.01)

(52) U.S. Cl.
CPC ......... *G06K 9/6257* (2013.01); *G06K 9/6262* (2013.01); *G06N 20/00* (2019.01); *G06K 2209/27* (2013.01)

(58) Field of Classification Search
CPC ..... G06K 9/6257; G06K 9/6262; G06N 20/00
See application file for complete search history.

(56) References Cited

U.S. PATENT DOCUMENTS

| 10,062,039 | B1 * | 8/2018 | Lockett | G06N 20/00 |
|---|---|---|---|---|
| 2016/0371601 | A1 * | 12/2016 | Grove | G06N 20/00 |
| 2018/0314982 | A1 * | 11/2018 | Gopalan | G06N 20/10 |
| 2018/0365580 | A1 * | 12/2018 | Musuvathi | G06Q 30/0244 |
| 2019/0042918 | A1 * | 2/2019 | Meyer | H04W 4/46 |
| 2019/0138940 | A1 * | 5/2019 | Feuz | G06N 20/00 |
| 2019/0258807 | A1 * | 8/2019 | DiMaggio | G06N 20/00 |
| 2019/0332940 | A1 * | 10/2019 | Han | G06N 3/0445 |
| 2020/0019858 | A1 * | 1/2020 | Han | G06N 3/04 |
| 2020/0027009 | A1 * | 1/2020 | Khan | G06K 9/6276 |
| 2020/0051260 | A1 * | 2/2020 | Shen | G06N 20/00 |
| 2020/0065630 | A1 * | 2/2020 | Cmielowski | G06N 20/00 |
| 2020/0090031 | A1 * | 3/2020 | Jakkam Reddi | G06N 3/0454 |

* cited by examiner

*Primary Examiner* — Utpal D Shah
(74) *Attorney, Agent, or Firm* — Nicholson De Vos Webster & Elliott, LLP

(57) ABSTRACT

Techniques for machine learning (ML) model knowledge distillation and automatic retraining are described. A model adaptation controller obtains samples generated by an edge device and inference values generated based on the samples by a deployed ML model of the edge device. The model adaptation controller runs inference on the samples using a different ML model to generate inferences that can be used to determine whether the performance of the deployed ML model is lacking. If so, the model adaptation controller can retrain the deployed ML model using samples with ground truth values generated by the different ML model, resulting in a light-weight retrained model that can be provisioned to the edge device. This retraining process may be performed iteratively to automatically improve and adapt the ML model running at the edge device.

20 Claims, 9 Drawing Sheets

| SAMPLE METADATA 126 | | | |
|---|---|---|---|
| DEVICE ID 202 | TIMESTAMP 204 | INFERENCE 206 | SAMPLE ID 208 |
| 9DAA2630EFABB125 | 2018-12-15 02:15:35 UTC | [["CAR", 0.932, 50, 70, 83, 70], ...] | X1/NUM1/XYZ1.JPG |

KNOWLEDGE DISTILLATION AND AUTOMATIC MODEL RETRAINING VIA EDGE DEVICE SAMPLE COLLECTION

BACKGROUND

With recent advancements in machine learning (ML), a natural next step is to deploy models on "edge" devices in various environments, such as "smart" cameras, mobile devices, smart speakers, toys, within motor vehicles, etc. This configuration can have the potential to allow inferences to be generated quicker (e.g., on a same device that obtains the data upon which the inference is generated, instead of remotely—such as in a cloud network or other centralized location) and enable faster reactions to these inferences to occur.

However, the hardware available to generate inferences (e.g., processing units such as central processing units (CPUs), graphical processing units (GPUs), tensor processing units (TPUs), field programmable gate arrays (FGPAs), etc., the amounts and types of available memory, etc.) and the architectures of these hardware resources (e.g., instruction set architectures (ISAs) such as x86, ARM, MIPS, SPARC) vary significantly from one edge device to another. Particularly, in many cases the set of hardware resources offered by an edge device are severely constrained due to a need to be low-powered and/or inexpensive, which creates a difficulty in being able to run sophisticated or large ML models. Further, new ML models are continually being developed that often rely on new types of operations or libraries, even further reducing the ability of typical edge devices to make practical use of these models.

BRIEF DESCRIPTION OF DRAWINGS

Various embodiments in accordance with the present disclosure will be described with reference to the drawings, in which.

DETAILED DESCRIPTION

Figure 1:
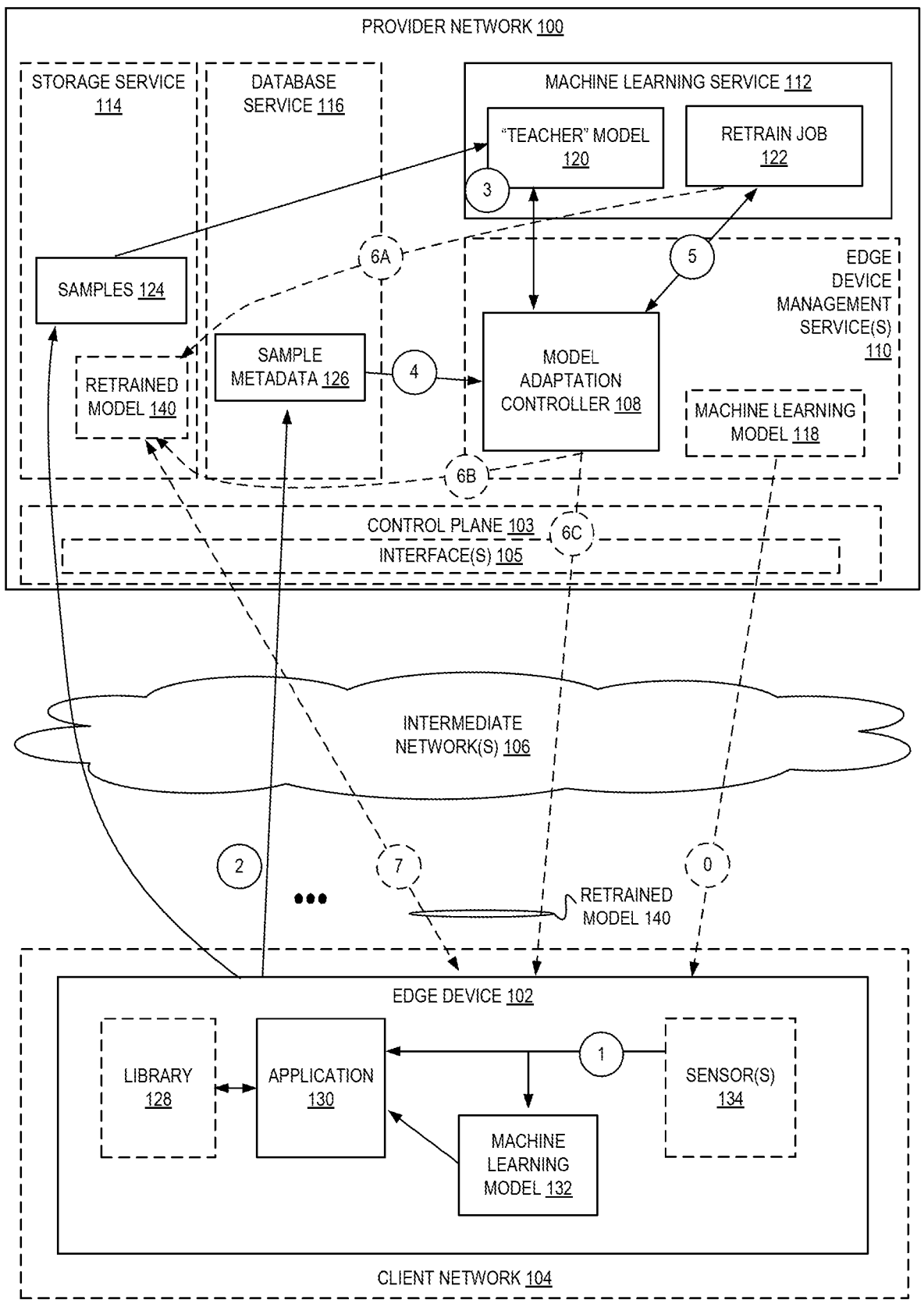
FIG. 1 is a diagram illustrating an environment for ML model knowledge distillation and automatic retraining according to some embodiments.

Various embodiments of methods, apparatus, systems, and non-transitory computer-readable storage media for ML model knowledge distillation and automatic retraining are described. According to some embodiments, a model adaptation controller can automatically "distill" large, state-of-the-art ML models into practical, deployable models for edge devices. In some embodiments, the model adaptation controller can automatically adapt a deployed model of a particular edge device to its particular environment and use case through automated retraining, allowing for the edge device to automatically improve its performance over a period of time. Embodiments may thus provide lighter-weight, more flexibly-executed models that can be run by edge devices with the similar inferential ability as more sophisticated heavy-weight models typically executed by devices with more resource capabilities. Moreover, embodiments adapt these models to particular usage scenarios of particular edge devices, and may repeatedly improve the functioning (e.g., accuracy) of these models in an automated manner often not needing continued user involvement. Accordingly, embodiments can provide a custom ML model that is particularly adapted to particular edge devices and particular tasks, providing increased accuracy over the common approach of deploying general-purpose models.

As indicated herein, the field of machine learning (and the specific category of deep learning) is developing extremely quickly. Many people and organizations are looking to machine learning to improve system availability through predictive maintenance, invent entirely new experiences on behalf of their customers, lower costs through automation, etc. In some cases, Internet of Things (IoT) type devices—which are commonly referred to as being part of a class of "edge" devices—are poised to play a central role in driving these improvements as running machine learning becomes more efficient and edge hardware capabilities continue to accelerate. However, successfully implementing machine learning at the edge in a sustainable and manageable way is elusive. First, due to their size, machine learning models are cumbersome to manage and deploy reliably. As a result, many types of models are rarely deployed to edge devices, lessening the likelihood of continually improving capabilities through the re-training of models. Second, many original equipment manufacturers (OEMs) and partners invest significant resources in developing hardware-specific optimizations to achieve adequate performance, and then have to hand-tune models for their specific environment. This can take many months and requires extremely deep knowledge of both hardware and machine learning. Moreover, data collected by edge devices often ends up going to waste since improved models are slow to engineer, and risky to deploy and manage at scale, meaning that once deployed, edge-based IoT strategies calcify and become brittle over time. Finally, as it is important for ML models running inference to be extremely efficient (e.g., to execute quickly due to a large amount of data requiring inference), deploying models to edge devices becomes extremely difficult when the edge devices have heterogeneous and/or constrained hardware resources—e.g., the existence or non-existence of CPU cores, GPUs, FPGAs, etc., differing architectures (x86, ARM, etc.), different resource amounts and availabilities (e.g., amounts of random access memory (RAM)), etc., Thus it is difficult to deploy efficient, optimized models to run inference to edge devices operating in different environments for different purposes.

Currently, most advances in ML are done using large amounts of computational resources. Often, ML models are explored with accuracy as the main goal rather than speed. Most advances for machine learning on the edge have been optimized edge models—such as MobileNet and SqueezeNet—which primarily employ optimizations to make convolutions faster for edge devices. Furthermore, most machine learning research focuses on creating models that generalize well to a wide variety of images. However, this is very different from industrial uses of machine learning, where speed, accuracy, and scalability are the primary goals. Embodiments disclosed herein solve these and other issues.

FIG. 1 is a diagram illustrating an environment for ML model knowledge distillation and automatic retraining according to some embodiments. FIG. 1 shows a model adaptation controller 108 of a provider network 100 that can distill understanding from complex ML models to other ML models that are suitable for deployment to edge devices 102 and can continually improve the performance of the deployed ML models via automated retraining.

The model adaptation controller 108 may be implemented as one or more software modules executed by one or more computing devices of the provider network 100 and may be a component of another service such as an edge device management service 110 that can manage the operation of edge devices 102 located outside the provider network 100. Generally, a provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and/or other computing resources may be provided as services, such as a hardware virtualization service that can execute compute instances, a storage service 114 that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s) 105, such as through use of application programming interface (API) calls, via a console implemented as a website or application, etc. The interface(s) 105 may be part of, or serve as a front-end to, a control plane 103 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance, e.g., by submitting code to be executed by the provider network, which in turn utilizes a compute instance to execute the code (typically without the user having any control of or knowledge of the underlying compute instance(s) involved).

As shown at optional circle (0), a machine learning model 118 may be deployed (e.g., to an edge device 102). This model 118 may be deployed from an edge device management service 110 of a provider network 100 responsive to a request from a user. Alternatively, the ML model 118 may be created or customized by a user and deployed—either directly or indirectly —onto the edge device 102 or obtained from another location outside of the provider network 100. For example, in some embodiments the user may upload a ML model to the provider network 100—e.g., to a storage service 114 or an edge device management service 110— which is then deployed by the edge device management service 110, e.g., by sending the edge device 102 the model itself or by sending the edge device 102 a command to download the model (e.g., from the storage service 114).

Upon being deployed to the edge device 102, the machine learning model 132 can be used to generate inferences, typically using a sample—that is, information or data— generated by one or more sensors 134 of the edge device 102 at circle (1). For example, the sensor(s) 134 may be optical sensors of a camera and the sample could be an image, though the sensor(s) 134 could also include a microphone, humidity sensor, temperature sensor, radio/energy sensor, touch senor, proximity sensor, or the like.

Thus, a sample such as an image (e.g., from a stream of images or just a single image) may be provided to a ML model 132 to generate an inference. The inference may be any of a variety of types of inferences resulting from a variety of types of useful ML models, such as a classification (e.g., one or more classification identifiers and corresponding probabilities), object detection (e.g., one or more detect object identifiers, each optionally along with probabilities and bounding box identifiers of the detected object), segmentation (e.g., a set of classes for pixels), etc.

The samples and inferences may be provided to an application 130 executed by the edge device 102, which may select certain ones of the samples (and corresponding inference values, together with other associated metadata) are sent at circle (2) to the provider network 100. In some embodiments, the application 130 is to send samples sporadically, for use in model evaluation, general data collection, and retraining. For example, the application 130 may send samples uniformly throughout time, which may be particularly beneficial early on in the deployment of a ML model 132 when it is not particularly accurate and a continued need exists to gather samples to label for additional training of the model, which prevents the system from biasing the dataset.

As another example, the application 130 may send samples during moments of low-probability inference, e.g., when the ML model 132 is "unsure" of its inference (e.g., selects a value with a particular confidence/probability that lies beneath a threshold).

As yet another example, the application 130 may send samples during particular moments of interest, which allows the system to further tune the model according to the specific use-case of the edge device 102. For example, if the ML model 132 is a face recognition model and has detected a person of interest, the application 130 may choose that moment to upload that sample image along with the relevant metadata to the provider network 100. The application 130 may also send samples during relatively light traffic times where the application 130 collecting, packaging, and sending this data would not substantially impact its typical working operation.

To upload the sample 124 and associated sample metadata 126, the application 130 may utilize application programming interfaces (APIs) of a library 128 (or "package"), which may have been provided by the provider network 100.

The sample metadata 126 may include the inference generated by the ML model 132 together with other relevant information, such as a timestamp of when the sample was generated or obtained by the application, an identifier of the edge device itself, an identifier of the sample such as its file name, an identifier of the ML model 132 or its version (e.g., an identifier of which network generated the inference results), etc.

Figure 2:
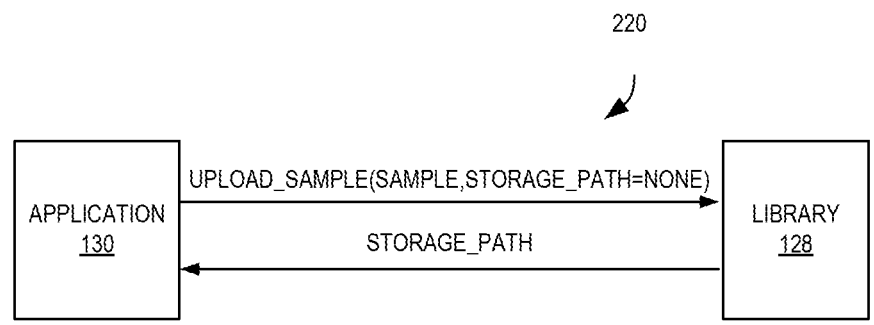
FIG. 2 is a diagram illustrating exemplary sample metadata and upload application programming interface (API) calls according to some embodiments.
Figure 2:
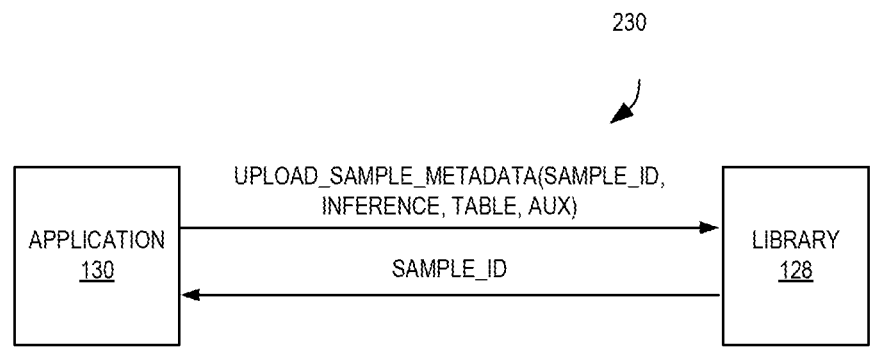

For example, FIG. 2 is a diagram illustrating exemplary sample metadata 126 and upload application programming interface (API) calls 220/230 according to some embodiments. Accordingly, For example, the application 130 may call a "upload_sample" function 220 to upload the sample 124 to a storage service 114 location and may call a "upload_sample_metadata" function 230 to upload a set of metadata corresponding to the sample to a database service 116.

The upload sample function 220 may include a sample itself (e.g., an image as generated by a sensor, or encoded using a library such as the OpenCV library) and optionally a storage_path indicating a location within the storage service that the sample will be saved to, where the omission of the storage_path may instead utilize a location according to a default naming scheme, e.g., "storage_service://<device_id>/<date>/<time>.<extension>". Upon the invocation of the upload sample function 220, the library 128 may establish a connection with the storage service 114 (e.g., using credentials of the device or the corresponding user account) and upload the sample to the location. Upon the successful upload, the library 128 may return a value such as the storage_path where the sample was successfully uploaded to. In some embodiments, the library 128 may additionally or alternatively return an error message indicating an error, such as when it was unable to reach the storage service, it received an error from the storage service (e.g., "access denied" or "invalid credentials"), etc.

The upload sample metadata function 230 may include an identifier of the sample (e.g., a filename of the sample, a full storage path of the sample (e.g., as returned by the upload sample function 220 call, etc.), the inference value generated by the deployed ML model 132, an identifier of a table (e.g., of a database) in which the sample metadata is to be stored to (e.g., optionally when no table identifier is present, the sample metadata may be stored to a unique table associated with the edge device), an optional auxiliary dictionary ("AUX") containing extra columns that the user may specify, etc. Upon the invocation of the upload sample metadata function 230, the library 128 may establish a connection with the provider network 100 (e.g., the database service 116) and issue a command to cause a new record to be stored in the proper database table. One exemplary record and table for sample metadata 126 is shown at the bottom of FIG. 2, where a device ID 202 value (here, an alphanumeric string that is uniquely associated with the edge device), a timestamp value 204 (e.g., of the creation of the sample, of the time of the record's insertion into the database, etc.), the inference value 206, and an identifier of the sample 208 (e.g., a storage path to where the sample is stored within the storage service) are included. Of course, various modifications to this schema may be used in different embodiments, and thus this formulation is exemplary and not to be viewed as limiting.

The inference value 206 may be of a variety of formats and types based on the type of ML model 132. For example, when the ML model 132 is a classifier, the inference value 206 may be of the format:

[[class_id, prob], . . . [class_id, prob]]

This format can beneficially allow for the easy calculation of cross-entropy loss in later items, if needed. The format may also be stored as an array instead of a tuple, for example, to more easily support multiclass labels. In some embodiments with a single class, the format may be stored as a nested list (e.g., [[class_id, prob]] instead of [class_id, prob]).

As another example, when the ML model 132 is a detection algorithm (and the sample is an image), the inference value 206 may be of the format:

[[class_id, prob, x1, y1, x2, y2], . . . ]

This format can beneficially allow for the easy calculation of the mean average precision (mAP) metric with intersection over union (IoU) due to the inclusion of the probability value. Additionally, this format is similar to the form that many Single Shot MultiBox Detector (SSD) models return by default. In some embodiments, the x1, y1, x2, y2 values are scaled to the correct size of the collected image, rather than the resized image that is fed into the machine learning model.

As another example, when the ML model 132 is a segmentation algorithm (and the sample is an image), the inference value 206 may be of the format:

[[pixel_cls, . . . , pixel_cls], . . . , [pixel_cls, . . . , pixel_cls]]

In some embodiments, the probabilities are not stored (as in the previous examples) as it might result in an extremely large storage requirement for the database—if there are num_classes number of classes, storing the probabilities would multiply the amount of data stored by num_classes. In these embodiments, metrics can be calculated without using the probability using the pixel mapping after the argmax has been applied.

Turning back to FIG. 1, this uploading of samples 124 and sample metadata 126 may occur for an amount of time, resulting in a collection of samples 124 (and metadata 126) being provided to the provider network 100.

At some point in time (e.g., according to a schedule, after a defined amount of time has passed, after a particular number of new samples have been uploaded, etc.) the model adaptation controller 108 may label a number of the collected samples 124. As shown, in some embodiments the model adaptation controller 108 may cause the samples 124 to be labeled using a "teacher" ML model 120 at circle (3), which may be a large, sophisticated, and/or state-of-the-art model. The teacher model 120 may be run via a machine learning service 112 that generates inferences upon request, and thus the model adaptation controller 108 may issue inference requests for each of the set of samples 124 to be labeled, or a single inference request that identifies the one (or likely, multiple) samples 124. In other, non-illustrated embodiments, the samples 124 may be labeled using other techniques, including but not limited to the use of human annotators.

With the labels (that is, the inference values from the teacher model 120 or annotators), the model adaptation controller 108 can compare how well the deployed model performs compared to the teacher model, which can be a driving factor in determining whether the deployed model 132 needs to be retrained. The labeled samples also give the model adaptation controller 108 "ground truth" labels for samples that were actually seen during the deployment of the edge device, which is particularly beneficial for future retraining to improve the accuracy of the edge ML model.

Thus, at circle (4), the model adaptation controller 108 may obtain the sample metadata 126 and compare the deployed ML model 132 inference values to the teacher model's 120 (or annotators') inference values to determine whether the performance (accuracy) of the deployed ML model 132 is satisfactory—e.g., the same as the teacher model 120, within a threshold amount of the teacher model 120, etc.

For example, the performance of the deployed ML model 132 can be measured in many ways using a particular metric for the given data distribution. Various metrics are used to evaluate performance of the model in various embodiments. A first metric is "Top N Accuracy" which is used for classification problems, and takes the predicted class labels in order, and determines whether or not the ground truth was in the top N predictions. However, this first metric is not applicable to multi-label classification problems.

Other known metrics include the "ROC Curve", which is a curve that is calculated using the true positive, false positive, true negative, and false negative numbers; the "Cross Entropy Loss", which is the direct computation of log loss between predicted class labels and ground truth; and/or "Intersection over Union," which is used for detection and/or image segmentation problems and determines how much a predicted bounding box intersects with the ground truth label by taking the intersection of the prediction and ground truth and dividing by the union. Alternatively, in some embodiments a user may provide their own custom metric by providing a "black box" function that takes in the predicted label and the teacher label and returns the metric result.

If the performance of the deployed ML model 132 is satisfactory with regard to these samples 124, the model adaptation controller 108 may halt its analysis until a next point in time when additional samples are to be analyzed.

However, when the performance of the deployed ML model 132 is not satisfactory, the model adaptation controller 108 can retrain the currently-deployed ML model 132 at circle (5) using a number of samples, including some or all of the "labeled" samples (from the teacher model 120 or annotators). For example, all samples 124 from some recent period of time may be identified using the timestamp information of the sample metadata 126. The model adaptation controller 108 may perform the retraining by issuing a request to the machine learning service 112 to perform a training job 122 of a particular ML model using some set of labeled samples, which returns a trained model (e.g., by storing it in a known location in a storage service 114, by directly returning it to the model adaptation controller 108, etc.). In some embodiments, at circle (6A) the retraining job 122 may store the output of the training—e.g., the model 140 and associated model artifacts—to a particular storage location of a storage service 114, for example.

In some embodiments, the retrained model may include unnecessary layers (e.g., training layers), and the model adaptation controller 108 may remove these layers to make the trained model smaller and more well-suited for deployment to the edge device.

In some embodiments, at circle (7) the edge device 102 may obtain the retrained model 140 from the storage service 114 and begin using it (e.g., instead of the previous ML model 132) to perform inference. For example, the retrained model 140 may be stored in a location (e.g., specified in a training request issued by the model adaptation controller 108 at circle (5)) that is associated with the particular edge device 102 or user account, and the edge device 102 may monitor the storage location for the existence of a retrained model 140, be notified (e.g., by an edge device management service 110) to the existence of a retrained model 140, etc., and then download the model 140. Thus, by specifying a particular destination location for the retrained model 140, the model adaptation controller 108 may thus cause the retrained model 140 to be deployed to the edge device 102.

Alternatively, at circle (6B), the model adaptation controller 108 may store the retrained model 140 at the particular location of the storage service 114 that the edge device 102 monitors for changes (and then downloads, at circle (7), to thereafter utilize the model), though in other embodiments the model adaptation controller 108 may be able to "push" a new model (or a message that a new model is available for download) to the edge device 102 at circle (6C).

Thus, embodiments provide a heavily-automated pipeline including a data collection from the edge device phase, a labeling of the collected data using a teacher model phase, an evaluation of the deployed model (based on labels from the teacher network) phase, and an optional retraining using the teacher network's inference values as ground truth and deployment back to the edge device. In some embodiments, this can be implemented as an automated pipeline from the user's perspective, where the model running on the edge device is automatically fine-tuned to its particular location and use-case.

Figure 3:
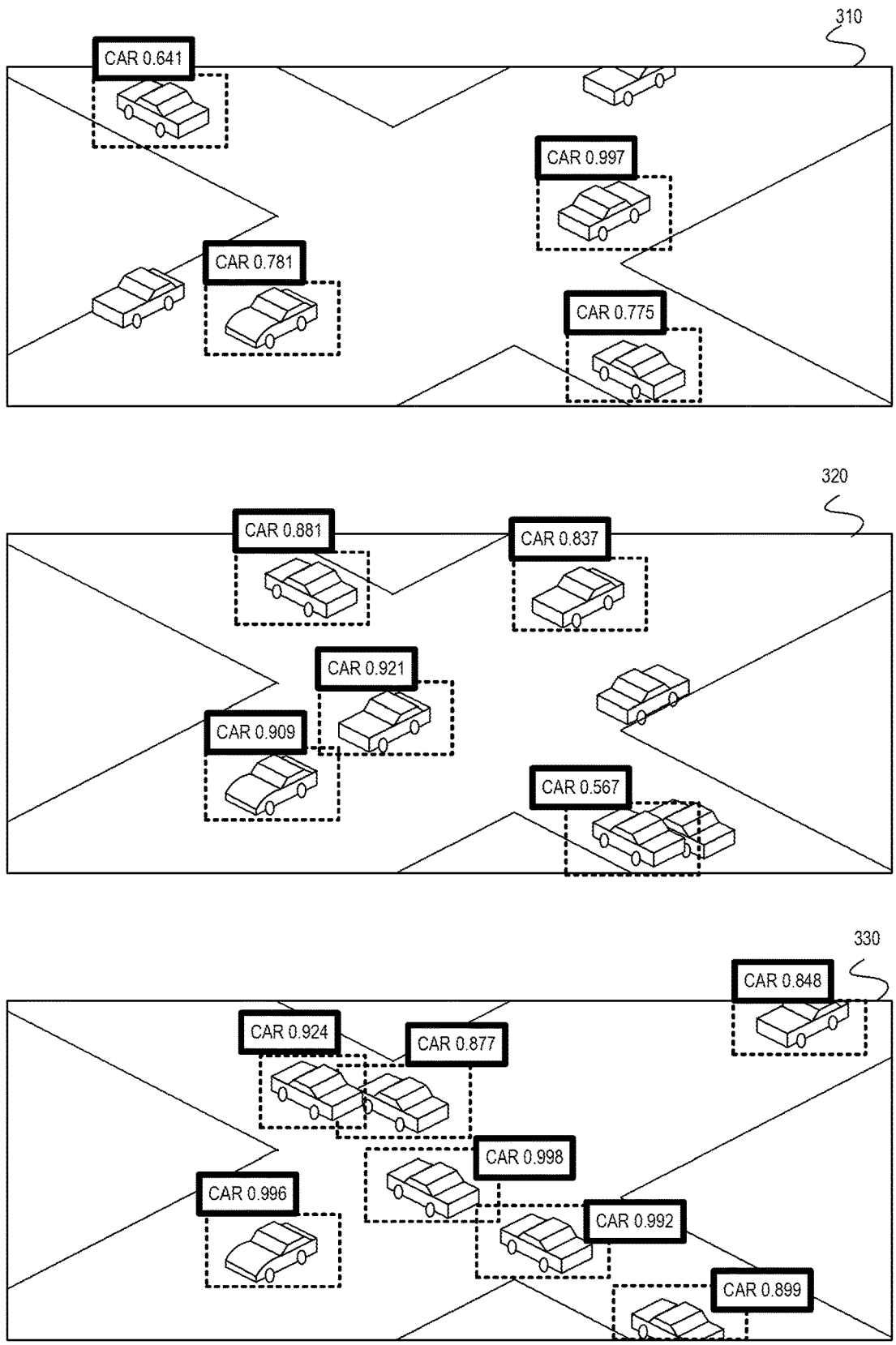
FIG. 3 is a diagram illustrating exemplary images and improved model performance due to repeated automatic retraining according to some embodiments.

Notably, in many embodiments this process can produce a reasonable size model that can be efficiently executed by an edge device, but with similar performance to state-of-the-art models and enables the edge device to automatically adapt to its particular environment. For example, FIG. 3 is a diagram illustrating exemplary images and improved model performance due to repeated automatic retraining. In this example, we assume that the deployed ML model 132 is an object recognition model such as a convolutional neural network that can identify particular objects within images. In this case, the edge device 102 may be a "smart" camera with some processing ability and thus has optical sensors that capture images—here, images of an intersection of a roadway. Initially, a relatively generic object detection model may be utilized by the model at 310, resulting in some of the cars being identified (albeit with relatively low confidence probabilities) and others of the cards not being identified whatsoever, such as those cars that are partially out of the frame.

After one or more rounds of the process described herein in which samples (images) are uploaded and the ML model is retrained based on the labels from a teacher model or annotator, the retrained ML model at 320 now exhibits improved performance in identifying nearly all of the cars, and at higher confidence probabilities. However, several cars are still not identified, such as one that is obstructed (due to another car).

After additional rounds of the process described herein in which samples (images) are uploaded and the ML model is retrained, the retrained ML model at 330 now displays significantly improved performance—all cars in the frame (both completely or partially, and obstructed or non-obstructed) have been identified, all of which with relatively high confidences. Notably, this result naturally arises due to the defects in earlier iterations of the retraining and redeployment being automatically corrected via the teacher model and/or annotators detecting the shortcomings of the deployed model, and providing new ground truth training data to improve the model's weaknesses. In this manner—potentially without any user involvement during these iterative rounds—the deployed ML model can continue to improve itself and "adapt" itself to its particular environment.

Figure 4:
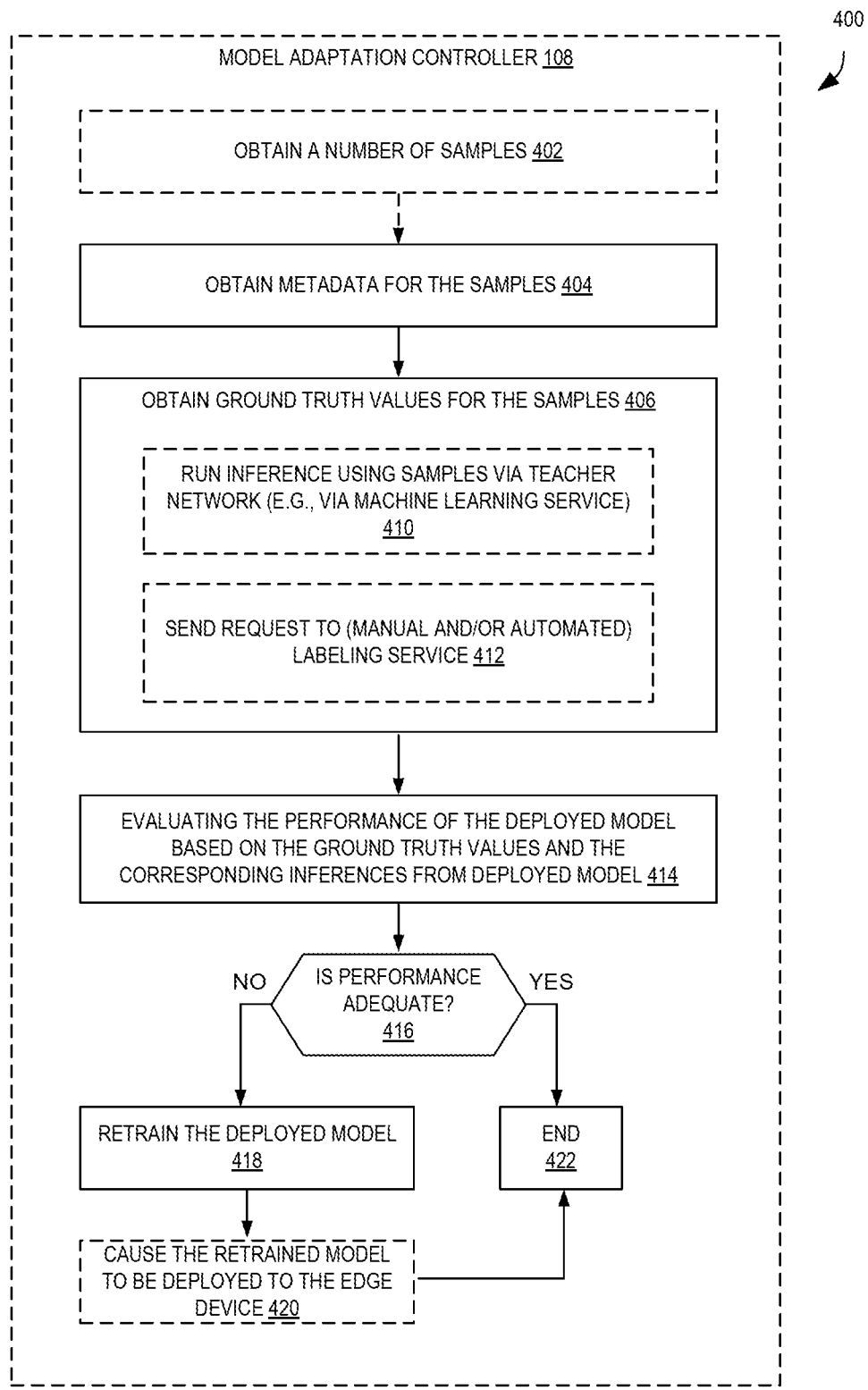
FIG. 4 is a flow diagram illustrating exemplary operations of a method performed by the model adaptation controller for ML model knowledge distillation and automatic retraining according to some embodiments.

FIG. 4 is a flow diagram illustrating exemplary operations of a method performed by the model adaptation controller for ML model knowledge distillation and automatic retraining according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by the model adaptation controller 108 of the other figures.

The operations 400 optionally include, at block 402, obtaining a number of samples. The samples may be obtained from a storage service in a provider network. Block 402 may include selecting a number of samples that have been uploaded by an edge device since a particular point in time, or selecting a number of samples that exist in a particular "folder" or bucket of the storage service.

The operations 400 include, at block 404, obtaining metadata for the samples. Block 404 may include querying a database provided by a database service of a provider network for sample metadata records (or portions thereof, such as the edge inference values corresponding to the obtained samples).

At block 406, the operations 400 include obtaining ground truth values for the samples. Block 406, in some embodiments, includes running a teacher network (or more generally, a teacher ML model) at block 410 using the obtained samples to generate inferences. The teacher network may be larger in size, more computationally complex, of a "newer" type or construction utilizing a new algorithm, etc., than a model deployed on the edge device that provided the samples. The teacher network may be run by sending a request to a machine learning service to perform inference, where the request identifies the teacher network and further identifies the location where the samples are located, allowing the machine learning service to obtain and provide the samples to the teacher network—though in other embodiments the samples may be provided with the request itself.

In other embodiments, block 406 includes sending a request at block 412 to a labeling service for labels for the samples, which may be generated using machine learning models and/or human annotators. In some embodiments, the request specifies a storage location where the samples are stored, and the labeling service may obtain and provide the samples to the human and/or automated labelers—however, in other embodiments the samples may be provided with the request itself.

The operations 400 include, at block 414, evaluating the performance of the deployed model based on the ground truth values and the corresponding inferences from deployed model. The evaluation may be based on determining a metric, such as Top N Accuracy, ROC Curve, Cross Entropy Loss, Intersection over Union, or a user-specified metric.

At decision block 416, the operations 400 include determining whether the performance is adequate. Block 416 may include determining whether a performance value generated at block 414 meets or exceeds a threshold.

If the performance is adequate, the operations 400 continue at block 422 with ending the process. However, if the performance is not adequate, the operations 400 continue at block 418 with retraining the deployed model, and at block 420 causing the retrained model to be deployed to the edge device. Block 418 may include sending a request to a machine learning service of the provider network to train the model using ones of the samples with the obtained ground truth values from block 406 as the ground truth labeled data. Block 420 may include sending the retrained model to a particular storage location of the storage service (where it can be downloaded by the edge device), or directly sending the retrained model to the edge device or some other service/entity that provisions the model. In some embodiments, block 420 is implicitly a part of block 418, in that causing the model to be retrained may include specifying an output storage location for the model that will be accessed by the edge device.

Figure 5:
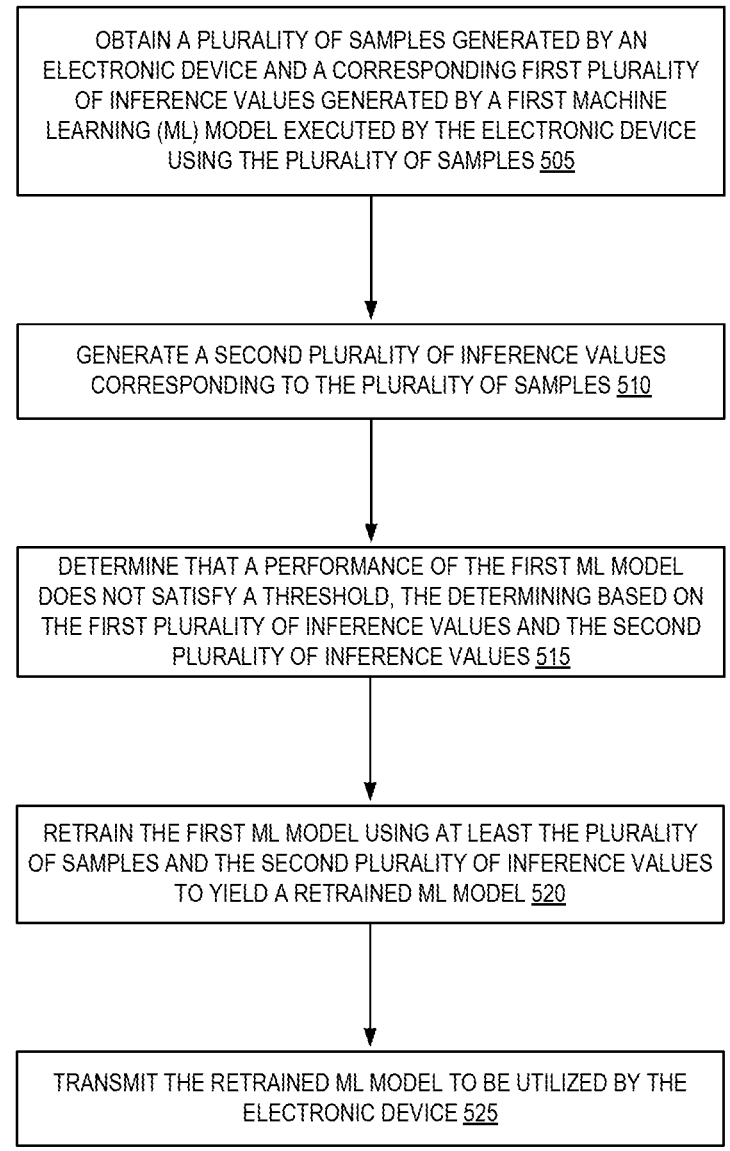
FIG. 5 is a flow diagram illustrating another set of exemplary operations of a method for ML model knowledge distillation and automatic retraining according to some embodiments.

FIG. 5 is a flow diagram illustrating another set of exemplary operations of a method for ML model knowledge distillation and automatic retraining according to some embodiments.

Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by components of the provider network 100 of the other figures.

The operations 500 include, at block 505, obtaining a plurality of samples generated by an electronic device and a corresponding first plurality of inference values generated by a first machine learning (ML) model executed by the electronic device using the plurality of samples. In some embodiments, the electronic device is an edge device deployed by a user, e.g., in a customer network.

In some embodiments, block 505 comprises receiving a first plurality of requests to store the plurality of samples to a storage location of a storage service (e.g., at an API endpoint associated with the storage service); and receiving a second plurality of requests to insert a plurality of metadata elements into a database of a database service (e.g., at an API endpoint associated with the database service), wherein each of the plurality of metadata elements comprises a corresponding one of the plurality of inference values. However, in some embodiments block 505 is performed by a model adaptation controller by receiving the plurality of samples and plurality of inference values (e.g., from the storage service and/or database service).

In some embodiments, each of the plurality of samples is an image obtained by a sensor of the electronic device, though in other embodiments the samples may be other types of data generated by the electronic device, such as an audio snippet, environmental reading, network activity summary or capture, etc.

In some embodiments, the first plurality of inference values are received as part of a plurality of metadata elements, wherein each of the plurality of metadata elements further includes at least two of: an identifier of the electronic device; a timestamp indicating when the sample was generated by the electronic device or transmitted by the electronic device; or an identifier of the sample corresponding to the metadata element.

At block 510, the operations 500 include generating a second plurality of inference values corresponding to the plurality of samples.

In some embodiments, block 510 includes executing a second ML model with the plurality of samples, and in some embodiments the second ML model is larger in at least one of size or complexity than the first ML model.

In some embodiments, block 510 includes causing the plurality of samples to be presented to one or more annotators (e.g., via an annotation service); and receiving the second plurality of inference values, the second plurality of inference values being created by the one or more annotators.

The operations 500 include, at block 515, determining that a performance of the first ML model does not satisfy a threshold, the determining based on the first plurality of inference values and the second plurality of inference values. Block 515 may include determining a metric value as described herein and determining whether it satisfies a threshold.

At block 520, the operations 500 include retraining the first ML model using at least the plurality of samples and the second plurality of inference values to yield a retrained ML model.

In some embodiments, block 520 comprises transmitting a request to a ML service of a provider network, determining that the ML service has completed retraining the first ML model, and obtaining a ML model from a storage location. The operations of block 520, in some embodiments, further include removing one or more layers (e.g., training layers) of the ML model to yield the retrained ML model.

The operations 500 include, at block 525, transmitting the retrained ML model to be utilized by the electronic device.

In some embodiments, the operations further include, before the obtaining of the plurality of samples and the corresponding first plurality of inference values, transmitting the first ML model to the electronic device.

In some embodiments, the electronic device operates within a client network that is separate from a provider network, and blocks 505-525 are performed by one or more computing devices within the provider network.

Figure 6:
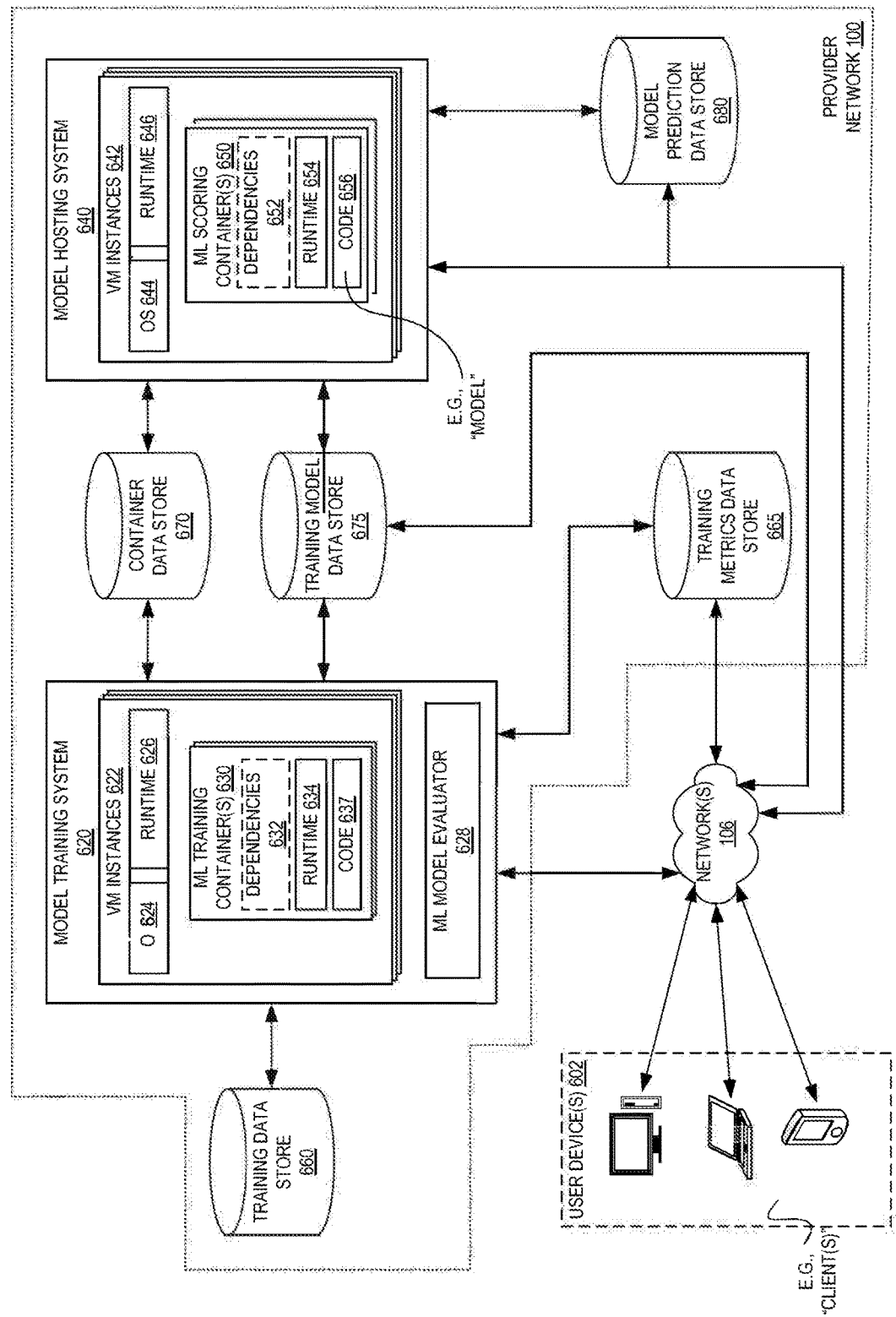
FIG. 6 is a block diagram of an illustrative operating environment in which machine learning models are trained and hosted according to some embodiments.

FIG. 6 is a block diagram of an illustrative operating environment in which machine learning models are trained and hosted according to some embodiments. The operating environment includes end user devices 602 (e.g., a PC or mobile device, or even an edge device 102), a model training system 620, a model hosting system 640, a training data store 660, a training metrics data store 665, a container data store 670, a training model data store 675, and a model prediction data store 680. A machine learning service described herein may include one or more of these entities, such as the model hosting system 640, model training system 620, etc.

In some embodiments, users, by way of user devices 602, interact with the model training system 620 to provide data that causes the model training system 620 to train one or more machine learning models. A machine learning model, generally, may be thought of as one or more equations that are "trained" using a set of data. In some embodiments, the model training system 620 provides ML functionalities as a Web service, and thus messaging between user devices 602 and the model training system 620 (or provider network 100), and/or between components of the model training system 620 (or provider network 100), may utilize HTTP messages to transfer data in a machine-readable file format, such as eXtensible Markup Language (XML) or JavaScript Object Notation (JSON).

The user devices 602 can interact with the model training system 620 via frontend 629 of the model training system 620. For example, a user device 602 can provide a training request to the frontend 629 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 602, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 602 may provide, in the training request, an algorithm written in any programming language. The model training system 620 packages the algorithm into a container (optionally with other code, such as a "base" ML algorithm supplemented with user-provided code) that is eventually loaded into a virtual machine instance 622 for training a machine learning model, as described in greater detail below. For example, a user, via a user device 602, may develop an algorithm/code using an application (e.g., an interactive web-based programming environment) and cause the algorithm/code to be provided—perhaps as part of a training request (or referenced in a training request)—to the model training system 620, where this algorithm/code may be containerized on its own or used together with an existing container having a machine learning framework, for example.

In some embodiments, instead of providing a container image in the training request, the user device 602 provides, in the training request, an indicator of a container image (e.g., an indication of an address or a location at which a container image is stored). For example, the container image can be stored in a container data store 670, and this container image may have been previously created/uploaded by the user. The model training system 620 can retrieve the container image from the indicated location and create a container using the retrieved container image. The container is then loaded into a virtual machine instance 622 for training a machine learning model, as described in greater detail below.

The model training system 620 can use the information provided by the user device 602 to train a machine learning model in one or more pre-established virtual machine instances 622 in some embodiments. In particular, the model training system 620 includes a single physical computing device or multiple physical computing devices that are interconnected using one or more computing networks (not shown), where the physical computing device(s) host one or more virtual machine instances 622. The model training system 620 can handle the acquisition and configuration of compute capacity (e.g., containers, instances, etc., which are described in greater detail below) based on the information describing the computing machine on which to train a machine learning model provided by the user device 602. The model training system 620 can then train machine learning models using the compute capacity, as is described in greater detail below. The model training system 620 can automatically scale up and down based on the volume of training requests received from user devices 602 via frontend 629, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance and can be utilized to isolate execution of a task from other processes (e.g., task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (e.g., creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 637, and dependencies 632 needed by the code 637 in some embodiments. The runtime 634 can be defined by one or more executable instructions that form at least a portion of a container image that is used to form the ML training container 630 (e.g., the executable instruction (s) in the container image that define the operating system and/or runtime to run in the container formed from the container image). The code 637 includes one or more executable instructions that form at least a portion of a container image that is used to form the ML training container 630. For example, the code 637 includes the executable instructions in the container image that represent an algorithm that defines a machine learning model, which may reference (or utilize) code or libraries from dependencies 632. The runtime 634 is configured to execute the code 637 in response to an instruction to begin machine learning model training. Execution of the code 637 results in the generation of model data, as described in greater detail below.

In some embodiments, the code 637 includes executable instructions that represent algorithms that define different machine learning models. For example, the code 637 includes one set of executable instructions that represent a first algorithm that defines a first machine learning model and a second set of executable instructions that represent a second algorithm that defines a second machine learning model. In some embodiments, the virtual machine instance 622 executes the code 637 and trains all of the machine learning models. In some embodiments, the virtual machine instance 622 executes the code 637, selecting one of the machine learning models to train. For example, the virtual machine instance 622 can identify a type of training data indicated by the training request and select a machine learning model to train (e.g., execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 620 uses one or more container images included in a training request (or a container image retrieved from the container data store 670 in response to a received training request) to create and initialize a ML training container 630 in a virtual machine instance 622. For example, the model training system 620 creates a ML training container 630 that includes the container image(s) and/or a top container layer.

Prior to beginning the training process, in some embodiments, the model training system 620 retrieves training data from the location indicated in the training request. For example, the location indicated in the training request can be a location in the training data store 660. Thus, the model training system 620 retrieves the training data from the indicated location in the training data store 660. In some embodiments, the model training system 620 does not retrieve the training data prior to beginning the training process. Rather, the model training system 620 streams the training data from the indicated location during the training process. For example, the model training system 620 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (e.g., a buffer storing the retrieved portion is nearly empty), then the model training system 620 can retrieve a second portion of the training data and provide the second retrieved portion to the virtual machine instance 622, and so on.

To perform the machine learning model training, the virtual machine instance 622 executes code 637 stored in the ML training container 630 in some embodiments. For example, the code 637 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (e.g., coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 620 as input parameters to some or all of the instructions being executed.

In some embodiments, executing the executable instructions causes the virtual machine instance 622 (e.g., the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 620 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user device 602 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 675.

In some embodiments, a virtual machine instance 622 executes code 637 stored in a plurality of ML training containers 630. For example, the algorithm included in the container image can be in a format that allows for the parallelization of the training process. Thus, the model training system 620 can create multiple copies of the container image provided in a training request and cause the virtual machine instance 622 to load each container image copy in a separate ML training container 630. The virtual machine instance 622 can then execute, in parallel, the code 637 stored in the ML training containers 630. The virtual machine instance 622 can further provide configuration information to each ML training container 630 (e.g., information indicating that N ML training containers 630 are collectively training a machine learning model and that a particular ML training container 630 receiving the configuration information is ML training container 630 number X of N), which can be included in the resulting model data. By parallelizing the training process, the model training system 620 can significantly reduce the training time in some embodiments.

In some embodiments, a plurality of virtual machine instances 622 execute code 637 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 620 can create multiple copies of the container image provided in a training request, initialize multiple virtual machine instances 622, and cause each virtual machine instance 622 to load a container image copy in one or more separate ML training containers 630. The virtual machine instances 622 can then each execute the code 637 stored in the ML training containers 630 in parallel. The model training system 620 can further provide configuration information to each ML training container 630 via the virtual machine instances 622 (e.g., information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 620 can significantly reduce the training time in some embodiments.

In some embodiments, the model training system 620 includes a plurality of physical computing devices and two or more of the physical computing devices hosts one or more virtual machine instances 622 that execute the code 637. Thus, the parallelization can occur over different physical computing devices in addition to over different virtual machine instances 622 and/or ML training containers 630.

In some embodiments, the model training system 620 includes a ML model evaluator 628. The ML model evaluator 628 can monitor virtual machine instances 622 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (e.g., known results), and thus the ML model evaluator 628 can define a machine learning model using the model data and execute the machine learning model by providing the input data as inputs to the machine learning model. The ML model evaluator 628 can then compare the outputs of the machine learning model to the expected outputs and determine one or more quality metrics of the machine learning model being trained based on the comparison (e.g., the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user device 602, can access and retrieve the model metrics from the training metrics data store 665. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 602, can transmit a request to the model training system 620 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 620 can modify the machine learning model accordingly. For example, the model training system 620 can cause the virtual machine instance 622 to optionally delete an existing ML training container 630, create and initialize a new ML training container 630 using some or all of the information included in the request, and execute the code 637 stored in the new ML training container 630 to restart the machine learning model training process. As another example, the model training system 620 can cause the virtual machine instance 622 to modify the execution of code stored in an existing ML training container 630 according to the data provided in the modification request. In some embodiments, the user, via the user device 602, can transmit a request to the model training system 620 to stop the machine learning model training process. The model training system 620 can then instruct the virtual machine instance 622 to delete the ML training container 630 and/or to delete any model data stored in the training model data store 675.

As described below, in some embodiments, the model data stored in the training model data store 675 is used by the model hosting system 640 to deploy machine learning models. Alternatively or additionally, a user device 602 or another computing device (not shown) can retrieve the model data from the training model data store 675 to implement a learning algorithm in an external device. As an illustrative example, a robotic device can include sensors to capture input data. A user device 602 can retrieve the model data from the training model data store 675 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (e.g., rapid initialization of machine learning model training in ML training container(s) 630) in response to training requests.

In some embodiments, the model training system 620 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model hosting system 640, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 640 includes a single physical computing device or multiple physical computing devices that are interconnected using one or more computing networks (not shown), where the physical computing device(s) host one or more virtual machine instances 642. The model hosting system 640 can handle the acquisition and configuration of compute capacity (e.g., containers, instances, etc.) based on demand for the execution of trained machine learning models. The model hosting system 640 can then execute machine learning models using the compute capacity, as is described in greater detail below. The model hosting system 640 can automatically scale up and down based on the volume of execution requests received from user devices 602 via frontend 649 of the model hosting system 640, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance and can be utilized to isolate execution of a task from other processes (e.g., task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (e.g., creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (e.g., supporting software such as libraries) needed by the code 656 in some embodiments. The runtime 654 can be defined by one or more executable instructions that form at least a portion of a container image that is used to form the ML scoring container 650 (e.g., the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (e.g., predicted or "inferred" results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 640 uses one or more container images included in a deployment request (or a container image retrieved from the container data store 670 in response to a received deployment request) to create and initialize a ML scoring container 650 in a virtual machine instance 642. For example, the model hosting system 640 creates a ML scoring container 650 that includes the container image(s) and/or a top container layer.

As described above, a user device 602 can submit a deployment request and/or an execution request to the model hosting system 640 via the frontend 649 in some embodiments. A deployment request causes the model hosting system 640 to deploy a trained machine learning model into a virtual machine instance 642. For example, the deployment request can include an identification of an endpoint (e.g., an endpoint name, such as an HTTP endpoint name) and an identification of one or more trained machine learning models (e.g., a location of one or more model data files stored in the training model data store 675). Optionally, the deployment request also includes an identification of one or more container images stored in the container data store 670.

Upon receiving the deployment request, the model hosting system 640 initializes ones or more ML scoring containers 650 in one or more hosted virtual machine instance 642. In embodiments in which the deployment request includes an identification of one or more container images, the model hosting system 640 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 640 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 640 further forms the ML scoring container(s) 650 by retrieving model data corresponding to the identified trained machine learning model(s) in some embodiments. For example, the deployment request can identify a location of model data file(s) stored in the training model data store 675. In embodiments in which a single model data file is identified in the deployment request, the model hosting system 640 retrieves the identified model data file from the training model data store 675 and inserts the model data file into a single ML scoring container 650, which forms a portion of code 656. In some embodiments, the model data file is archived or compressed (e.g., formed from a package of individual files). Thus, the model hosting system 640 unarchives or decompresses the model data file to obtain multiple individual files and inserts the individual files into the ML scoring container 650. In some embodiments, the model hosting system 640 stores the model data file in the same location as the location in which the model data file was stored in the ML training container 630 that generated the model data file. For example, the model data file initially was stored in the top container layer of the ML training container 630 at a certain offset, and the model hosting system 640 then stores the model data file in the top container layer of the ML scoring container 650 at the same offset.

In embodiments in which multiple model data files are identified in the deployment request, the model hosting system 640 retrieves the identified model data files from the training model data store 675. The model hosting system 640 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 640 associates the initialized ML scoring container(s) 650 with the endpoint identified in the deployment request. For example, each of the initialized ML scoring container(s) 650 can be associated with a network address. The model hosting system 640 can map the network address(es) to the identified endpoint, and the model hosting system 640 or another system (e.g., a routing system, not shown) can store the mapping. Thus, a user device 602 can refer to trained machine learning model(s) stored in the ML scoring container(s) 650 using the endpoint. This allows for the network address of an ML scoring container 650 to change without causing the user operating the user device 602 to change the way in which the user refers to a trained machine learning model.

Once the ML scoring container(s) 650 are initialized, the ML scoring container(s) 650 are ready to execute trained machine learning model(s). In some embodiments, the user device 602 transmits an execution request to the model hosting system 640 via the frontend 649, where the execution request identifies an endpoint and includes an input to a machine learning model (e.g., a set of input data). The model hosting system 640 or another system (e.g., a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 640 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively or in addition, the virtual machine instance 642 transmits the output to the user device 602 that submitted the execution result via the frontend 649.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 602 via the frontend 649 (e.g., if no more trained machine learning models are needed to generate an output) or transmit the second output to a third ML scoring container 650 initialized in the same or different virtual machine instance 642 (e.g., if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (e.g., rapid initialization of ML scoring container(s) 650, rapid execution of code 656 in ML scoring container(s), etc.) in response to deployment and/or execution requests.

In some embodiments, the model hosting system 640 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model training system 620, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi-arm bandit models, reinforcement learning models, ensemble machine learning models, deep learning models, or the like.

The model training system 620 and the model hosting system 640 depicted in FIG. 6 are not meant to be limiting. For example, the model training system 620 and/or the model hosting system 640 could also operate within a computing environment having a fewer or greater number of devices than are illustrated in FIG. 6. Thus, the depiction of the model training system 620 and/or the model hosting system 640 in FIG. 6 may be taken as illustrative and not limiting to the present disclosure. For example, the model training system 620 and/or the model hosting system 640 or various constituents thereof could implement various Web services components, hosted or "cloud" computing environments, and/or peer-to-peer network configurations to implement at least a portion of the processes described herein. In some embodiments, the model training system 620 and/or the model hosting system 640 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 602 and provisions virtual machine instances 622. In some embodiments, the frontend 629 serves as a front door to all the other services provided by the model training system 620. The frontend 629 processes the requests and makes sure that the requests are properly authorized. For example, the frontend 629 may determine whether the user associated with the training request is authorized to initiate the training process.

Similarly, frontend 649 processes all deployment and execution requests received from user devices 602 and provisions virtual machine instances 642. In some embodiments, the frontend 649 serves as a front door to all the other services provided by the model hosting system 640. The frontend 649 processes the requests and makes sure that the requests are properly authorized. For example, the frontend 649 may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 620 and the model hosting system 640, this is not meant to be limiting. For example, in some embodiments not shown, the training data store 660 is located internal to at least one of the model training system 620 or the model hosting system 640.

In some embodiments, the training metrics data store 665 stores model metrics. While the training metrics data store 665 is depicted as being located external to the model training system 620 and the model hosting system 640, this is not meant to be limiting. For example, in some embodiments not shown, the training metrics data store 665 is located internal to at least one of the model training system 620 or the model hosting system 640.

The container data store 670 stores container images, such as container images used to form ML training containers 630 and/or ML scoring containers 650, that can be retrieved by various virtual machine instances 622 and/or 642. While the container data store 670 is depicted as being located external to the model training system 620 and the model hosting system 640, this is not meant to be limiting. For example, in some embodiments not shown, the container data store 670 is located internal to at least one of the model training system 620 and the model hosting system 640.

The training model data store 675 stores model data files. In some embodiments, some of the model data files are comprised of a single file, while other model data files are packages of multiple individual files. While the training model data store 675 is depicted as being located external to the model training system 620 and the model hosting system 640, this is not meant to be limiting. For example, in some embodiments not shown, the training model data store 675 is located internal to at least one of the model training system 620 or the model hosting system 640.

The model prediction data store 680 stores outputs (e.g., execution results) generated by the ML scoring containers 650 in some embodiments. While the model prediction data store 680 is depicted as being located external to the model training system 620 and the model hosting system 640, this is not meant to be limiting. For example, in some embodiments not shown, the model prediction data store 680 is located internal to at least one of the model training system 620 and the model hosting system 640.

While the model training system 620, the model hosting system 640, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 602 via the one or more network(s) 106.

Various example user devices 602 are shown in FIG. 6, including a desktop computer, laptop, and a mobile phone, each provided by way of illustration. In general, the user devices 602 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 620 and/or the model hosting system 640 provides the user devices 602 with one or more user interfaces, command-line interfaces (CLI), application programming interfaces (API), and/or other programmatic interfaces for submitting training requests, deployment requests, and/or execution requests. In some embodiments, the user devices 602 can execute a stand-alone application that interacts with the model training system 620 and/or the model hosting system 640 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (e.g., for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
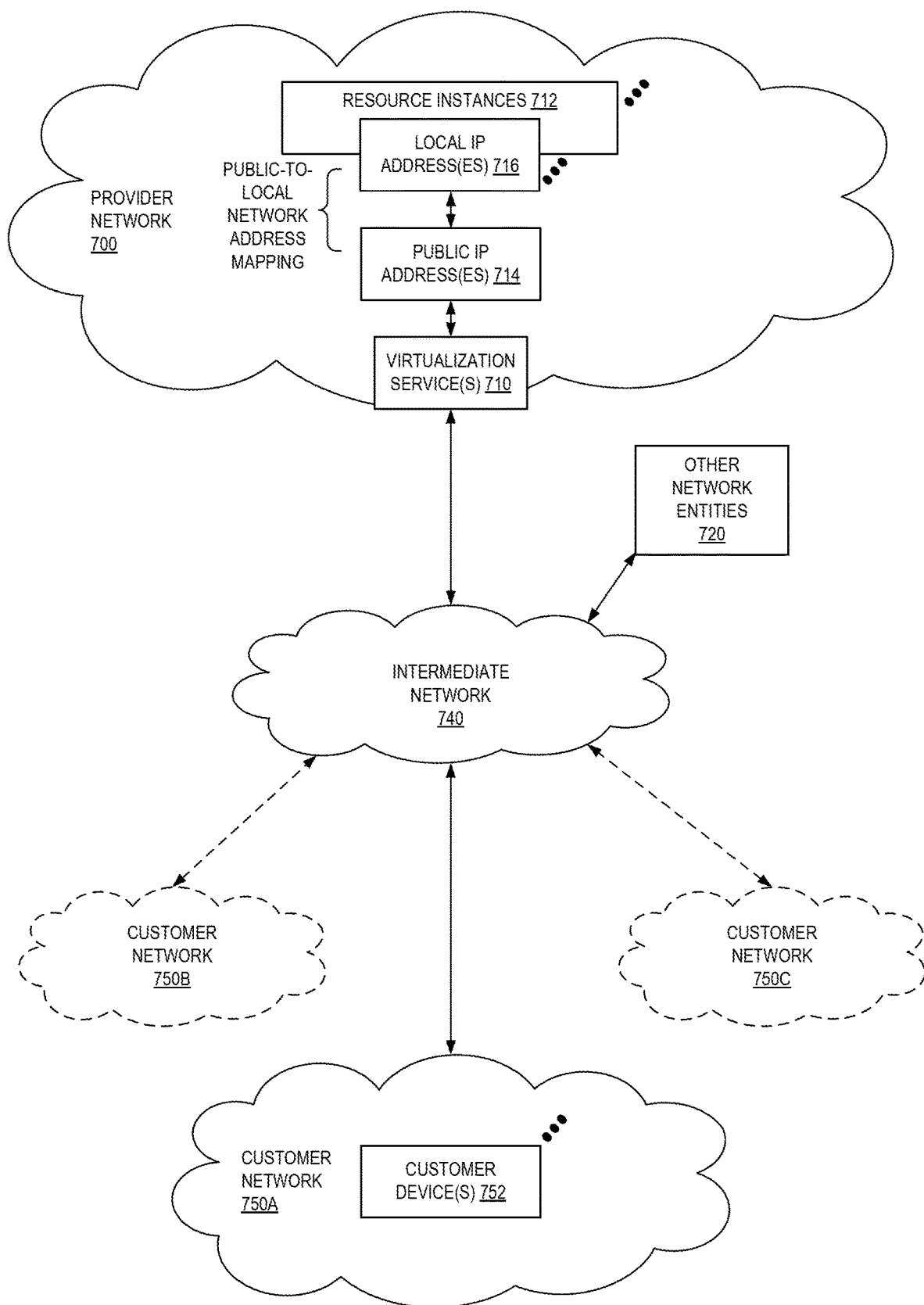
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
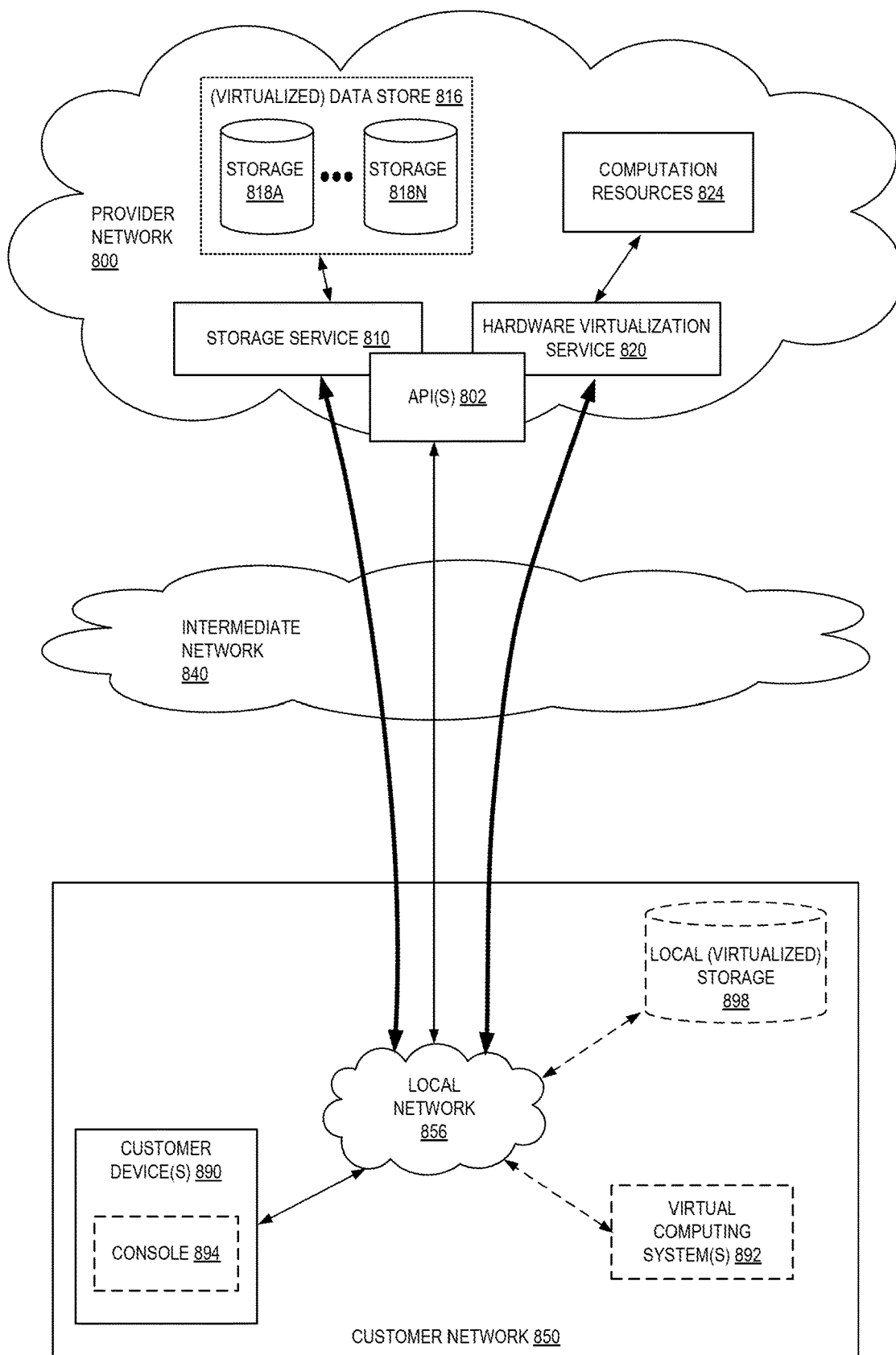
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
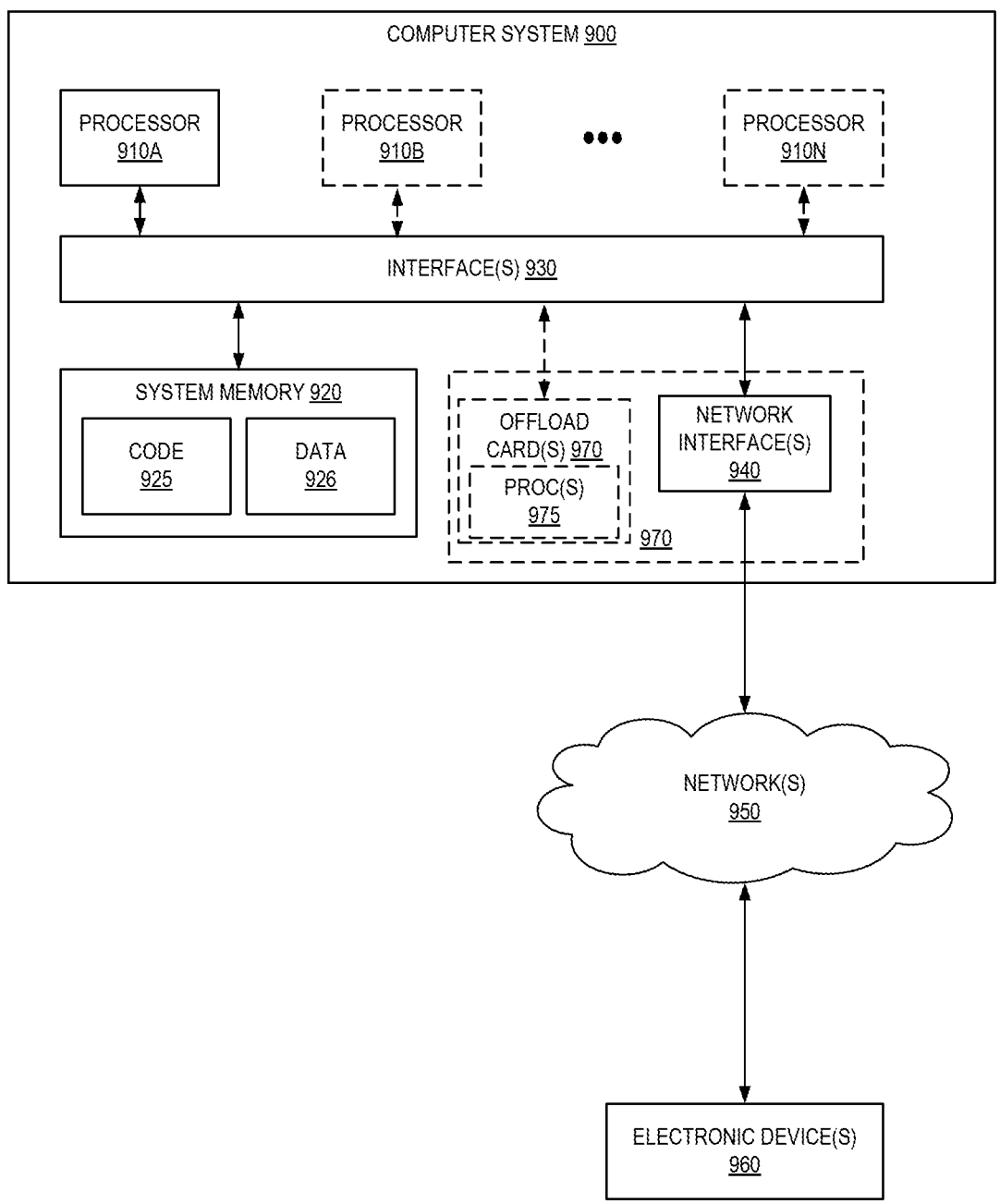
FIG. 9 is a block diagram illustrating an example computer system that may be used in some embodiments.

In some embodiments, a system that implements a portion or all of the techniques for ML model knowledge distillation and automatic retraining as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a provider network from an electronic device located outside the provider network, a plurality of images and a corresponding first plurality of inference values, wherein the plurality of images were generated by the electronic device and each of first plurality of inference values was generated by a first machine learning (ML) model executed by the electronic device using a corresponding one of the plurality of images, wherein the first plurality of inference values are received as part of a plurality of metadata elements, wherein each of the plurality of metadata elements further includes at least two of:
   an identifier of the electronic device;
   a timestamp indicating when the image was generated by the electronic device or transmitted by the electronic device; or
   an identifier of the image corresponding to the metadata element;
   executing, in the provider network, a second ML model with the plurality of images to generate a corresponding second plurality of inference values;
   evaluating the performance of the first ML model based on the first plurality of inference values and the second plurality of inference values;
   determining, based on the evaluating of the performance, a need to retrain the first ML model;
   retraining the first ML model using the plurality of images and the second plurality of inference values generated by the second ML model to yield a retrained ML model; and
   transmitting the retrained ML model to the electronic device.

2. The computer-implemented method of claim 1, wherein the second ML model is larger in at least one of size or complexity than the first ML model and the retrained ML model.

3. The computer-implemented method of claim 1, further comprising:
   receiving a second plurality of images and a third plurality of inference values generated by the retrained ML model executed by the electronic device;
   executing the second ML model with the second plurality of images to generate a fourth plurality of inference values;

determining a need to retrain the retrained ML model;
retraining the retrained ML model using the second plurality of images and the fourth plurality of inference values to yield a second retrained ML model; and
transmitting the second retrained ML model to the electronic device.

4. A computer-implemented method comprising:
obtaining a plurality of samples generated by an electronic device and a corresponding first plurality of inference values generated by a first machine learning (ML) model executed by the electronic device using the plurality of samples, wherein the first plurality of inference values are received as part of a plurality of metadata elements, wherein each of the plurality of metadata elements further includes at least two of:
an identifier of the electronic device;
a timestamp indicating when the sample was generated by the electronic device or transmitted by the electronic device; or
an identifier of the sample corresponding to the metadata element;
generating a second plurality of inference values corresponding to the plurality of samples;
determining that a performance of the first ML model does not satisfy a threshold, the determining based on the first plurality of inference values and the second plurality of inference values;
retraining the first ML model using at least the plurality of samples and the second plurality of inference values to yield a retrained ML model; and
transmitting the retrained ML model to be utilized by the electronic device.

5. The computer-implemented method of claim 4, wherein generating the second plurality of inference values comprises executing a second ML model with the plurality of samples.

6. The computer-implemented method of claim 5, wherein the second ML model is larger in at least one of size or complexity than the first ML model and the retrained ML model.

7. The computer-implemented method of claim 4, wherein generating the second plurality of inference values comprises:
causing the plurality of samples to be presented to one or more annotators; and
receiving the second plurality of inference values, the second plurality of inference values being created by the one or more annotators.

8. The computer-implemented method of claim 4, wherein each of the plurality of samples is an image obtained by a sensor of the electronic device.

9. The computer-implemented method of claim 4, further comprising:
before the obtaining of the plurality of samples and the corresponding first plurality of inference values, transmitting the first ML model to the electronic device.

10. The computer-implemented method of claim 4, wherein retraining the first ML model comprises transmitting a request to a ML service of a provider network, determining that the ML service has completed retraining the first ML model, and obtaining a ML model from a storage location.

11. The computer-implemented method of claim 10, wherein retraining the first ML model to yield the retrained ML model further comprises removing one or more layers of the ML model to yield the retrained ML model.

12. The computer-implemented method of claim 4, wherein obtaining the plurality of samples and the corresponding first plurality of inference values comprises:
receiving a first plurality of requests to store the plurality of samples to a storage location of a storage service; and
receiving a second plurality of requests to insert a plurality of metadata elements into a database of a database service, wherein each of the plurality of metadata elements comprises a corresponding one of the first plurality of inference values.

13. The computer-implemented method of claim 4, wherein the electronic device operates within a client network that is separate from a provider network, wherein the obtaining, generating, comparing, retraining, and transmitting are performed by one or more computing devices within the provider network.

14. The computer-implemented method of claim 4, wherein at least one of the first plurality of inference values comprises a class identifier and a probability value.

15. The computer-implemented method of claim 14, wherein the at least one of the first plurality of inference values further comprises one or more coordinates indicating one or locations associated with an object detected within the corresponding sample.

16. A system comprising:
a first one or more electronic devices of a provider network to implement a storage service, the storage service to store a plurality of samples generated by an electronic device that is outside of the provider network;
a second one or more electronic devices of the provider network to implement a database service, the database service to store a first plurality of inference values generated by a first machine learning (ML) model executed by the electronic device using the plurality of samples, wherein the first plurality of inference values are received at the database service as part of a plurality of metadata elements, wherein each of the plurality of metadata elements further includes at least two of:
an identifier of the electronic device;
a timestamp indicating when the sample was generated by the electronic device or transmitted by the electronic device; or
an identifier of the sample corresponding to the metadata element;
a third one or more electronic devices of the provider network to implement a model adaptation controller, the model adaptation controller including instructions that upon execution cause the model adaptation controller to:
generate a second plurality of inference values corresponding to the plurality of samples;
determine that a performance of the first ML model does not satisfy a threshold based on the first plurality of inference values and the second plurality of inference values;
compare ones of the first plurality of inference values with ones of the second plurality of inference values;
retrain the first ML model using at least the plurality of samples and the second plurality of inference values to yield a retrained ML model; and
transmit the retrained ML model to be utilized by the electronic device.

17. The system of claim 16, wherein to generate the second plurality of inference values, the instructions upon execution cause the model adaptation controller to execute a second ML model with the plurality of samples.

18. The system of claim 17, wherein the second ML model is larger in at least one of size or complexity than the first ML model and the retrained ML model.

19. The system of claim 16, wherein to generate the second plurality of inference values, the instructions upon execution cause the model adaptation controller to:
cause the plurality of samples to be presented to one or more annotators; and
receive the second plurality of inference values, the second plurality of inference values being created by the one or more annotators.

20. The system of claim 16, wherein each of the plurality of samples is an image obtained by a sensor of the electronic device.

\* \* \* \* \*